(12) United States Patent
Armangau et al.

(10) Patent No.: US 11,163,496 B1
(45) Date of Patent: Nov. 2, 2021

(54) SYSTEMS AND METHODS OF UPDATING PERSISTENT STATISTICS ON A MULTI-TRANSACTIONAL AND MULTI-NODE STORAGE SYSTEM

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Yubing Wang, Southborough, MA (US); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/918,357

(22) Filed: Jul. 1, 2020

(51) Int. Cl.
G06F 3/06 (2006.01)

(52) U.S. Cl.
CPC .......... G06F 3/0659 (2013.01); G06F 3/0604 (2013.01); G06F 3/065 (2013.01); G06F 3/067 (2013.01); G06F 3/0653 (2013.01)

(58) Field of Classification Search
CPC ...... G06F 3/0659; G06F 3/065; G06F 3/0604; G06F 3/0653; G06F 3/067
See application file for complete search history.

(56) References Cited

U.S. PATENT DOCUMENTS

| | | | |
|---|---|---|---|
| 7,155,573 B1 | 12/2006 | Levin-Michael et al. | |
| 7,542,975 B2* | 6/2009 | Rjaibi | G06F 16/284 |
| 8,356,013 B2 | 1/2013 | Fachan et al. | |
| 9,569,356 B1 | 2/2017 | Wei et al. | |
| 10,083,093 B1 | 9/2018 | Natanzon et al. | |
| 10,990,530 B1 | 4/2021 | Chanler et al. | |
| 2010/0235604 A1* | 9/2010 | Oe | G06F 3/0605 711/170 |
| 2011/0276690 A1* | 11/2011 | Whitehouse | G06F 9/526 709/226 |
| 2016/0041878 A1* | 2/2016 | Davis | G11C 29/76 714/6.13 |
| 2016/0283129 A1* | 9/2016 | Wang | G06F 3/0685 |
| 2016/0378388 A1* | 12/2016 | Hegde | G06F 9/5016 711/166 |
| 2018/0278686 A1* | 9/2018 | Sprague | H04L 43/04 |
| 2019/0339889 A1* | 11/2019 | Lu | G06F 12/0284 |
| 2021/0117339 A1* | 4/2021 | Wang | G06F 3/067 |

* cited by examiner

*Primary Examiner* — Hiep T Nguyen
(74) *Attorney, Agent, or Firm* — BainwoodHuang

(57) ABSTRACT

Techniques for updating persistent statistics on a multi-transactional and multi-node storage system. The techniques can be practiced in a distributed storage system including a plurality of storage nodes. Each storage node can include a persistent storage configured to accommodate a set of delta counter pages, as well as a global counter page for summarizing delta count values tracked by respective delta counters. The techniques can include, in each storage node, tracking, by each of a set of delta counters, changes to delta count values due to storage node operations performed on units of data storage, and summarizing, periodically or at least at intervals, the delta count values of the respective delta counters as global count values. The techniques can further include summarizing the global count values across the respective storage nodes in a count summarization report and sending the count summarization report to a client via a communications interface.

20 Claims, 7 Drawing Sheets

SYSTEMS AND METHODS OF UPDATING PERSISTENT STATISTICS ON A MULTI-TRANSACTIONAL AND MULTI-NODE STORAGE SYSTEM

BACKGROUND

Distributed storage systems include a plurality of storage processors (also referred to herein as "storage nodes"), which have shared storage input/output (IO) access to storage objects (e.g., volumes (VOLs), virtual volumes (VVOLs), logical units (LUs), file systems) and/or other storage resources. Such distributed storage systems typically employ global counters, which are shared among the respective storage nodes. The global counters are employed within the distributed storage systems to track various counts related to units of data storage (e.g., blocks, files, pages, segments, chunks) such as free block counts, allocated block counts, and so on.

SUMMARY

In a distributed storage system that includes a plurality of storage nodes, updates to shared global counters can be performed at various times by any of the respective storage nodes. Further, the global counters can be synchronized across the plurality of storage nodes on-demand, periodically, and/or as triggered by an event such as an update of a respective global counter. Synchronization of global counter updates in a distributed storage system can be problematic, however, because it often requires frequent communications between the respective storage nodes, which can be costly in terms of time and/or processing resources. The respective storage nodes within the distributed storage system can also contend with one another while making updates to the shared global counters.

Moreover, such a distributed storage system can be configured to provide log structured, filesystem-based data storage, which can require certain statistics for determining when to expand storage capacity, perform garbage collection activities, provide statistic reports to one or more client computers (also referred to herein as "clients"), and so on. Updates to the statistics can be performed by any of the respective storage nodes each time mapping information for filesystem data is updated. To track the statistics, each of the plurality of storage nodes can employ local delta counters in a non-persistent memory (e.g., random-access memory (RAM)), in association with the shared global counters. Maintaining local delta counters in a non-persistent memory can also be problematic, however, particularly when a storage node suffers a panic shutdown. Upon rebooting or restarting after the panic shutdown, the storage node can be required to perform a complicated procedure to recover local delta counter information, which can again be costly in terms of time and/or processing resources.

Techniques are disclosed herein for updating persistent statistics on a multi-transactional and multi-node storage system. The disclosed techniques can be practiced in a distributed storage system configured to provide log structured, filesystem-based data storage. The distributed storage system can include a plurality of storage nodes, each of which can be communicably coupled with one or more storage resources over one or more networks. Each storage node can include a persistent storage, which can be configured to accommodate a set of delta counter pages, as well as a global counters page for summarizing delta count values tracked by respective delta counters. The disclosed techniques can include, in each storage node of a distributed storage system, tracking, by each of a set of delta counters in a persistent storage, changes to delta count values due to client operations performed on units of data storage, and summarizing, on-demand, periodically, or at least at intervals, the delta count values of the respective delta counters as global count values in the persistent storage. The disclosed techniques can further include summarizing the global count values across the respective storage nodes in a count summarization report and sending the count summarization report to a client via a communications interface.

By tracking changes to delta count values due to client operations by a set of delta counters in a persistent storage of a storage node, summarizing the delta count values as global count values in the persistent storage, and further summarizing the global count values across a plurality of storage nodes in a count summarization report for subsequent transmission to a client, any contention resulting from concurrent updating of one or more global counts pages by two or more storage nodes can be avoided. Moreover, because a set of delta counters and global count values can be maintained in a persistent storage on each respective storage node, recovery of the delta counters and global count values can be performed with reduced time and/or processing complexity in the event of a storage node panic shutdown.

In certain embodiments, a method of updating persistent statistics on a multi-transactional and multi-node storage system includes tracking changes to delta count values due to client operations by a set of delta counters in a persistent storage of each respective storage node from among a first plurality of storage nodes in a distributed storage system, summarizing the delta count values tracked by the set of delta counters as global count values in the persistent storage of each respective storage node, and summarizing the global count values across the first plurality of storage nodes in a count summarization report for subsequent transmission to a client of the distributed storage system.

In certain arrangements, the method further includes, in response to a first client operation, receiving, at the respective storage node, a first write input/output (TO) request, and, upon receipt of the first write IO request, writing a data chunk onto a first data segment of log structured data storage.

In certain arrangements, the method further includes, in response to a second client operation, receiving, at the respective storage node, a second write IO request, and, upon receipt of the second write IO request, writing a modified version of the data chunk onto a second data segment of log structured data storage. Each of the first client operation and the second client operation is associated with a first delta counter page from among a plurality of delta counter pages in the persistent storage. The set of delta counters is implemented on the first delta counter page.

In certain arrangements, the method further includes, having written the modified version of the data chunk onto the second data segment of log structured data storage, updating a first delta counter from among the set of delta counters to reflect a decreased utilization of the first data segment, and updating a second delta counter from among the set of delta counters to reflect an increased utilization of the second data segment.

In certain arrangements, the method further includes, in response to one or more additional client operations, receiving, at the respective storage node, one or more additional write IO requests, and, in response to the additional write IO requests, writing one or more additional data chunks or modified versions of the additional data chunks to one or more additional data segments of log structured data storage.

In certain arrangements, at least one of the additional client operations is associated with a second delta counter page from among the plurality of delta counter pages in the persistent storage. The method further includes, having written the one or more additional data chunks or modified versions of the additional data chunks to the one or more additional data segments of log structured data storage, updating one or more additional delta counters of an additional set of delta counters implemented on the second delta counter page to reflect one or more of a decreased utilization and an increased utilization of the respective additional data segments.

In certain arrangements, the method further includes summarizing (i) the delta count values tracked by the set of delta counters implemented on the first delta counter page and (ii) additional delta count values tracked by the additional set of delta counters implemented on the second delta counter page to obtain the global count values in the persistent storage of the respective storage node.

In certain arrangements, the summarizing of the global count values across the first plurality of storage nodes is performed in a first layer of global count summarization. The method further includes summarizing, in the first layer of global count summarization, additional global count values across a second plurality of storage nodes in the distributed storage system.

In certain arrangements, the method further includes summarizing, in a second layer of global count summarization, the global count values across the first plurality of storage nodes and the additional global count values across the second plurality of storage nodes in the count summarization report for subsequent transmission to the client of the distributed storage system.

In certain embodiments, a distributed storage system includes a first plurality of storage nodes, in which each respective storage node from among the first plurality of storage nodes includes a persistent storage. The persistent storage includes at least a first delta counter page, a second delta counter page, and a global counters page. Each respective storage node from among the first plurality of storage nodes includes a first processor configured to execute program instructions out of a memory to track, by a set of delta counters implemented on the first delta counter page, changes to delta count values due to one or more client operations, summarize, by one or more global counters implemented on the global counters page, the delta count values as global count values in the persistent storage of each respective storage node, and summarize the global count values across the first plurality of storage nodes in a count summarization report for subsequent transmission to a client of the distributed storage system.

In certain arrangements, the distributed storage system includes a second plurality of storage nodes, in which each respective storage node from among the second plurality of storage nodes includes a second processor. The first processor is further configured to execute program instructions out of the memory to summarize, in a first layer of global count summarization, the global count values across the first plurality of storage nodes in the distributed storage system. The second processor is configured to execute program instructions out of a memory to summarize, in the first layer of global count summarization, additional global count values across the second plurality of storage nodes in the distributed storage system.

In certain arrangements, the distributed storage system further includes a third processor configured to execute program instructions out of a memory to summarize, in a second layer of global count summarization, the global count values across the first plurality of storage nodes and the additional global count values across the second plurality of storage nodes in the count summarization report for subsequent transmission to the client of the distributed storage system.

In certain embodiments, a computer program product includes a set of non-transitory, computer-readable media having instructions that, when executed by storage processing circuitry, cause the storage processing circuitry to perform a method that includes tracking changes to delta count values due to client operations by a set of delta counters in a persistent storage of each respective storage node from among a first plurality of storage nodes in a distributed storage system, summarizing the delta count values tracked by the set of delta counters as global count values in the persistent storage of each respective storage node, and summarizing the global count values across the first plurality of storage nodes in a count summarization report for subsequent transmission to a client of the distributed storage system.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2b is a block diagram of an exemplary storage node that can be included in the storage appliance of FIG. 2a;

DETAILED DESCRIPTION

Techniques are disclosed herein for updating persistent statistics on a multi-transactional and multi-node storage system. The disclosed techniques can be practiced in a distributed storage system, which can include a plurality of storage nodes. Each storage node can include a persistent storage configured to accommodate a set of delta counter pages, as well as a global counters page for summarizing delta count values tracked by respective delta counters. The disclosed techniques can include, in each storage node, tracking, by each of a set of delta counters in a persistent storage, changes to delta count values due to client operations performed on units of data storage, and summarizing, on-demand, periodically, or at least at intervals, the delta count values of the respective delta counters as global count values in the persistent storage.

The disclosed techniques can further include summarizing the global count values across the respective storage nodes in a count summarization report and sending the count summarization report to a client via a communications interface.

Figure 1:
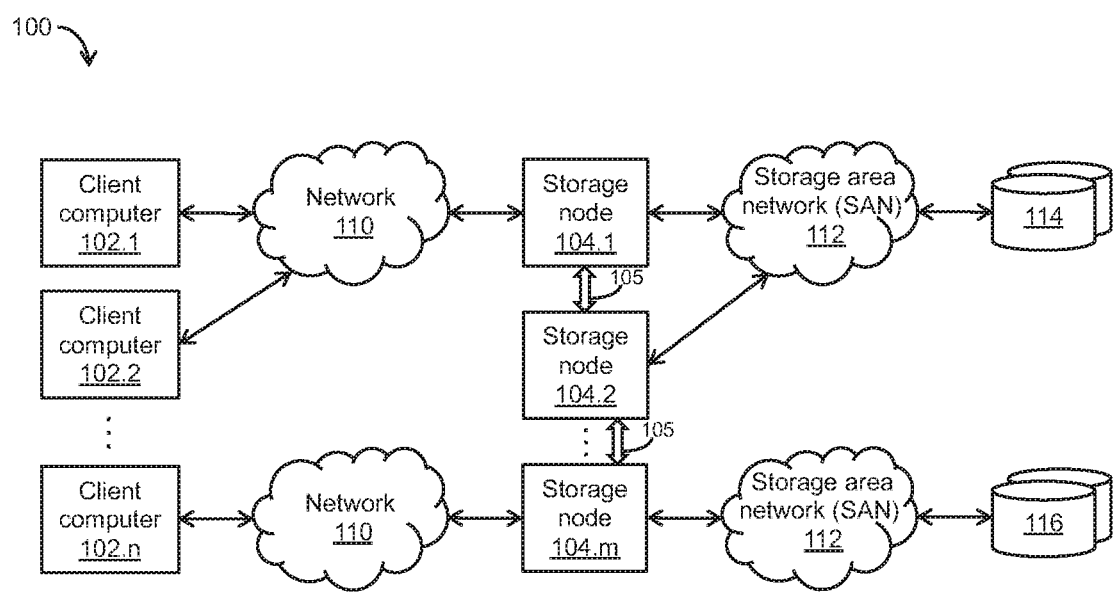
FIG. 1 is a block diagram of an exemplary storage system environment, in which techniques can be practiced for updating persistent statistics on a multi-transactional and multi-node storage system.

FIG. 1 depicts an illustrative embodiment of an exemplary storage system environment 100, in which techniques can be practiced for updating persistent statistics on a multi-transactional and multi-node storage system. As shown in FIG. 1, the storage system environment 100 can include a plurality of client computers (also referred to herein as "clients") 102.1, 102.2, . . . , 102.*n*, a plurality of storage processors (also referred to herein as "storage nodes") 104.1, 104.2, . . . , 104.*m*, and at least one network 110 configured to communicably couple the respective clients 102.1, . . . , 102.*n* with one or more of the plurality of storage nodes 104.1, . . . , 104.*m*. For example, each of the plurality of clients 102.1, . . . , 102.*n* can be configured as a web server computer, a file server computer, an email server computer, an enterprise server computer, and/or any other suitable client/server computer or computerized device. Each of the plurality of clients 102.1, . . . , 102.*n* can be further configured to provide, over one or more of the networks 110, storage input/output (IO) requests (e.g., small computer system interface (SCSI) commands, server message block (SMB) commands, network file system (NFS) commands, common Internet file system (CIFS) commands, file transfer protocol (FTP) commands, SSH file transfer protocol (SFTP) commands) to one or more of the plurality of storage nodes 104.1, . . . , 104.*m*. Such storage IO requests (e.g., write IO requests, read IO requests) can direct a respective storage node to write or read blocks, files, pages, segments, chunks, or any other suitable units of data storage to/from volumes (VOLs), virtual volumes (VVOLs), logical units (LUs), file systems, and/or any other suitable storage objects or resources maintained in association with the respective storage nodes 104.1, . . . , 104.*m*.

Each network 110 can be configured to interconnect one or more of the clients 102.1, . . . , 102.*n* with one or more of the storage nodes 104.1, . . . , 104.*m* to enable them to communicate and exchange data and/or control signaling. As shown in FIG. 1, each network 110 is illustrated as a "cloud" to represent different communications topologies such as a backbone topology, a hub-and-spoke topology, a loop topology, an irregular topology, and so on, or any suitable combination thereof. As such, the network(s) 110 can include copper-based data communications devices and cabling, fiber optic-based communications devices and cabling, wireless communications devices, and so on, or any suitable combination thereof. Further, the network(s) 110 can be configured to support direct wired or wireless communications, Internet communications, local area network (LAN) communications, metropolitan area network (MAN) communications, wide area network (WAN) communications, VLAN communications, proprietary network communications, Fibre channel (FC) network communications, and so on.

Each of the plurality of storage nodes 104.1, . . . , 104.*m* can be communicably coupled, over one or more storage area networks (SAN) (see, e.g., FIG. 1; reference numeral 112), one or more network attached storage (NAS) networks, and/or any other suitable network(s), with one or more storage resources 114, 116, each of which can include one or more storage targets such as non-volatile random-access memory (NVRAM), solid-state drives (SSDs), hard disk drives (HDDs), flash memory, and/or any other suitable storage targets for storing object data and/or metadata. The respective storage nodes 104.1, . . . , 104.*m* can be located in close physical proximity to one another or remotely located (e.g., geographically remote) from one another. Further, each storage node 104.1, . . . , 104.*m* can be configured to engage in intercommunications with one or more of the other storage nodes 104.1, . . . , and/or 104.*m* over one or more networks 105, such as one or more private networks, IP networks, FC networks, and so on.

Figure 2A:
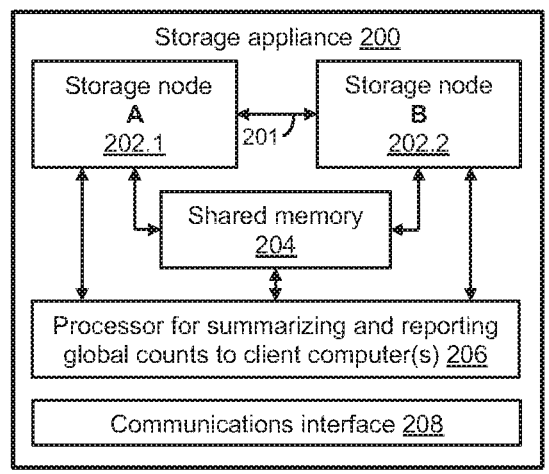
FIG. 2a is a block diagram of an exemplary storage appliance that can be deployed in the storage system environment of FIG. 1.

FIG. 2a depicts an exemplary storage appliance 200 that can be deployed in the storage system environment 100 of FIG. 1. In one embodiment, the storage appliance 200 can be configured as an active-active storage system, such as a highly available storage system that includes two or more storage nodes (e.g., a storage node A 202.1, a storage node B 202.2) having simultaneous read-write IO access to the same storage objects or resources (e.g., volumes (VOLs), virtual volumes (VVOLs), logical units (LUs), file systems). As shown in FIG. 2a, the storage appliance 200 can include at least the storage node A 202.1 and the storage node B 202.2 communicably connected to one another by a communication path(s) 201. For example, the storage node A 202.1 can be configured to receive storage IO requests from the respective clients 102.1, . . . , 102.*n* over the network(s) 110. In response to the storage IO requests, the storage node A 202.1 can perform storage IO operations (e.g., read-write IO operations) to read/write blocks, files, pages, segments, chunks, or any other suitable units of data storage to/from one or more of the storage resources 114, 116. Such read-write IO operations can be maintained in a data log (not shown) implemented on a memory 204, which can be shared between the respective storage nodes A 202.1, B 202.2. For example, the data log can be implemented as a ring buffer, a linear buffer, a binary tree ("b-tree"), or any other suitable memory structure. Further, the shared memory 204 can be configured to include one or more device caches (also referred to herein as a "storage caches") for caching data of the storage resources 114, 116. In the event of a failure of the storage node A 202.1 (or the storage node B 202.2) or at any other suitable time, the storage node B 202.2 (or the storage node A 202.1) can assume the role and/or duties of the other storage node A 202.1 or B 202.2 with regard to the handling of storage IO requests, thereby providing high availability within the active-active storage system.

In one embodiment, the storage node A 202.1 and the storage node B 202.2 can each include a persistent storage configured to accommodate a set of delta counter pages and a global counters page for summarizing delta count values tracked by the respective delta counters, as described herein. As shown in FIG. 2a, the storage appliance 200 can include a processor 206 configured to summarize, in a count summarization report, global count values maintained on global counters pages of the respective storage nodes A 202.1, B 202.2 and send it to one or more of the respective clients 102.1, . . . , 102.n via a communications interface 208. For example, the communications interface 208 can include a SCSI interface, an Ethernet interface, an FC interface, an InfiniBand interface, and/or any other suitable communications interface.

Figure 2B:
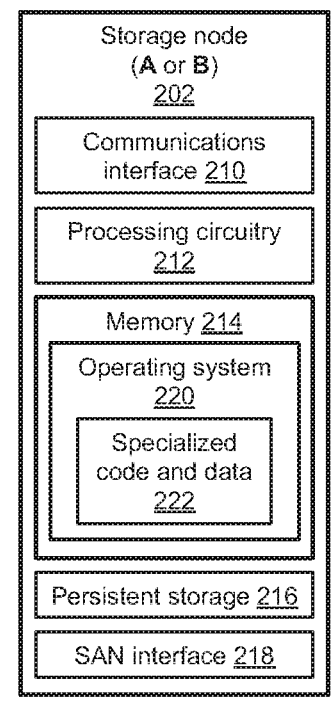

FIG. 2b depicts an exemplary storage node 202 that can be included in the storage appliance 200 of FIG. 2a. It is noted that each of the storage nodes A 202.1, B 202.2 of FIG. 2a can be configured like the storage node 202. Likewise, each of the storage nodes 104.1, . . . , 104.m of FIG. 1 can be configured like the storage node 202. As shown in FIG. 2b, the storage node 202 can include a communications interface 210, processing circuitry 212, a memory 214, a persistent storage 216, and a network (e.g., SAN) interface 218 or any other suitable network interface. The communications interface 210 can include a SCSI interface, an Ethernet interface, an FC interface, an InfiniBand interface, and/or any other suitable communications interface. The communications interface 210 can further include SCSI adapters, Ethernet adapters, FC adapters, InfiniBand adapters, and/or any other suitable adapters for converting electronic, optical, and/or wireless signals received over the network(s) 110 to a form suitable for use by the processing circuitry 212.

The memory 214 of the storage node 202 can include a volatile memory such as a RAM, RAM cache, and/or any other suitable volatile memory. The term "cache" is employed herein to refer to memory ("cache memory") that is faster and more easily accessible by a processor than other non-cache memory used by a device. The memory 214 can be configured to store a variety of software constructs realized in the form of specialized code and data 222 (e.g., program instructions and data), which can be executed by the processing circuitry 212 to carry out the techniques and/or methods disclosed herein. The memory 214 can further include an operating system 220 such as a Linux operating system (OS), a Unix OS, a Windows OS, or any other suitable operating system.

The processing circuitry 212 of the storage node 202 can include one or more physical storage processors and/or engines configured to execute the specialized code and data 222, as well as one or more data movers, director boards, blades, IO modules, storage drive controllers, switches, and/or any other suitable computer hardware or combination thereof. Further, the processing circuitry 212 can be configured to execute the specialized code and data 222 as program instructions out of the memory 214, process storage IO requests (e.g., read IO requests, write IO requests) issued by the plurality of clients 102.1, . . . , 102.n, and/or store data and/or metadata to the storage resources 114, 116 within the storage system environment 100, which can be a distributed storage system environment.

In the context of the processing circuitry 212 being implemented using one or more processors executing the specialized code and data 222, a computer program product can be configured to deliver all or a portion of the specialized code and data 222 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

The persistent storage 216 of the storage node 202 can include a persistent RAM (e.g., NVRAM) or any other suitable persistent storage. The persistent storage 216 can be configured to accommodate a set of delta counter pages, as well as a global counters page for summarizing delta count values tracked by respective delta counters. For example, such delta count values tracked by the respective delta counters can correspond to free block counts, allocated block counts, virtual block counts, counts relating to the utilization of data storage units (e.g., blocks, files, pages, segments, chunks), and so on. Such delta count values can be used to determine the best candidates from among a set of data storage units for relocation, garbage collection, space reclamation, and so on. Further, global count values maintained across a plurality of storage nodes can be used to determine the average block utilization within a distributed storage system, as well as establish policies for expanding storage capacity, performing garbage collection activities, performing compact-and-append operations, and so on.

Such global count values can be summarized in a count summarization report, which can provide useful information for the clients 102.1, . . . , 102.n pertaining to the utilization of the distributed storage system. For example, such information can include warnings to notify the clients 102.1, . . . , 102.n that the system is running out of free storage space and requiring additional physical storage (e.g., disk drives). It is noted that the number of delta counter pages in each set can be equal to at least twice the number "n" of clients 102.1, . . . , 102.n that have access to the plurality of storage nodes 104.1, . . . , 104.m or any other suitable number. In this way, it can be effectively assured that, if all "n" of the clients 102.1, . . . , 102.n are actively updating delta counts, then, at each storage node 104.1, . . . , 104.m, at least "n" delta counter pages can be available for summarization to a global counters page at the appropriate time. It is noted that each operation of the respective clients 102.1, . . . , 102.n that requires an update to filesystem statistics can be associated with a corresponding delta counter page in the persistent storage 216.

Figure 2C:
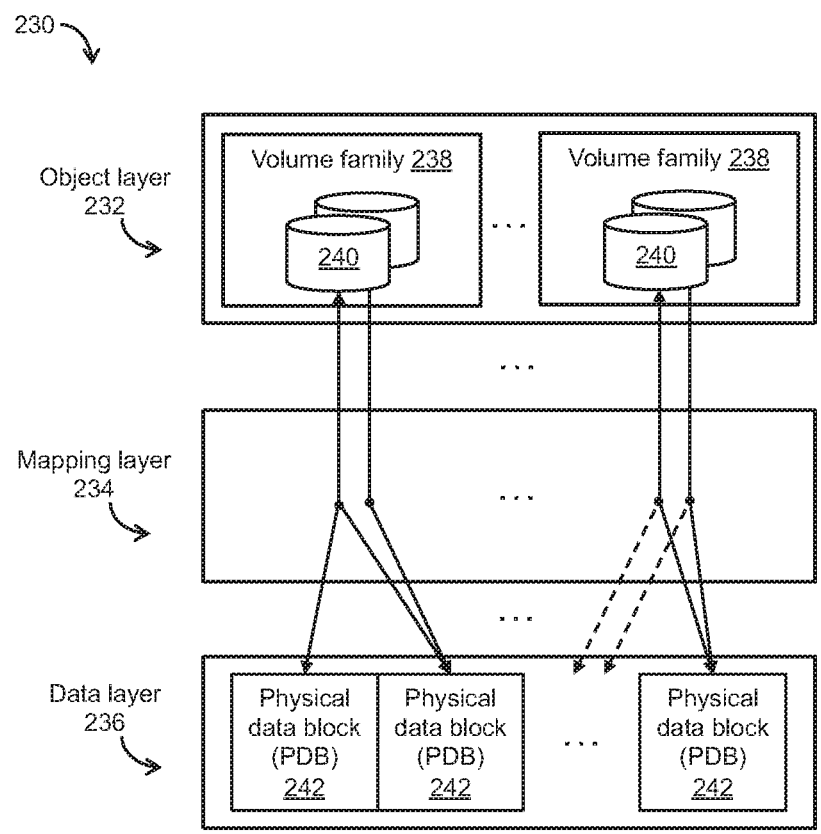
FIG. 2c is a block diagram of an exemplary multi-layer functional organization of the storage node of FIG. 2b.

FIG. 2c depicts an exemplary multi-layer functional organization 230 of the storage node 202 of FIG. 2b. It is noted that much of the functionality depicted in FIG. 2c can be realized by software constructs executed by the processing circuitry 212. As shown in FIG. 2c, the multi-layer functional organization 230 can include three (3) functional layers, namely, an object layer 232, a mapping layer 234, and a data layer 236. The object layer 232 can be configured to establish and maintain a so-called "logical view" of storage objects such as volumes 240, and to present the respective volumes 240 to the plurality of clients 102.1, . . . , 102.n as objects of storage IO operations (e.g., read-write IO operations). In one embodiment, the volumes 240 can be organized into volume families 238, in which the volumes 240 of a respective volume family 238 can include a current volume (also referred to herein as a "primary volume"), as well as one or more point-in-time (PIT) copies of the primary volume (also referred to herein as "snapshots").

The data layer 236 of the multi-layer functional organization 230 can be configured to maintain actual data for the respective volumes 240 as one or more collections of physical data blocks (PDBs) 242. In one embodiment, the PDBs 242 can be physical data blocks of an internal file system of the mapping layer 234. The PDBs 242 can have a fixed size such as 2 megabytes (Mb) or any other suitable size. Further, the PDBs 242 can be stored in any of a variety of ways on a set of non-volatile storage media such as magnetic media, flash-programmable semiconductor media, and so on The mapping layer 234 of the multi-layer functional organization 230 can be configured to translate between the logical view of the volumes 240 maintained by the object layer 232 and the collection(s) of PDBs 242 maintained by the data layer 236. As illustrated in FIG. 2c, each volume 240 can be mapped by the mapping layer 234 to a corresponding collection of PDBs 242. It is noted that a given PDB 242 can belong to a collection that corresponds to more than one volume 240. In this way, the mapping layer 234 can implement what is referred to herein as "block sharing," which can include mapping logical data blocks of two or more of the volumes 240 to the same PDB 242. For example, such block sharing can be used by the storage node 202 to support snapshot functionality within the storage appliance 200.

During operation, each of the plurality of storage nodes 104.1, ..., 104.m within the storage system environment 100 (e.g., the storage node 202; see FIG. 2b) can include a persistent storage (e.g., the persistent storage 216; see FIG. 2b), which can be configured to accommodate a set of delta counter pages, as well as a global counters page for summarizing delta count values tracked by respective delta counters. Further, each such storage node 104.1, ..., 104.m can be configured to track, by each of a plurality of delta counters in the persistent storage, changes to delta count values due to client operations performed on units of data storage, and summarize, on-demand, periodically, or at least at intervals, the delta count values of the respective delta counters as global count values in the persistent storage. Further, the global count values can be summarized across the respective storage nodes 104.1, ..., 104.m in a count summarization report, which can be sent to one or more of the plurality of clients 102.1, ... 102.n via a communications interface (e.g., the communications interface 208; see FIG. 2a).

By tracking changes to delta count values due to client operations by a plurality of delta counters in a persistent storage of a storage node, summarizing the delta count values as global count values in the persistent storage, and further summarizing the global count values across a plurality of storage nodes in a count summarization report for subsequent transmission to a client, any contention resulting from concurrent updating of one or more global counter pages by two or more storage nodes can be avoided. Moreover, because a plurality of delta counters and global count values can be maintained in a persistent storage on each respective storage node, recovery of the delta counters and global count values can be performed with reduced time and/or processing complexity in the event of a storage node panic shutdown.

Figure 3:
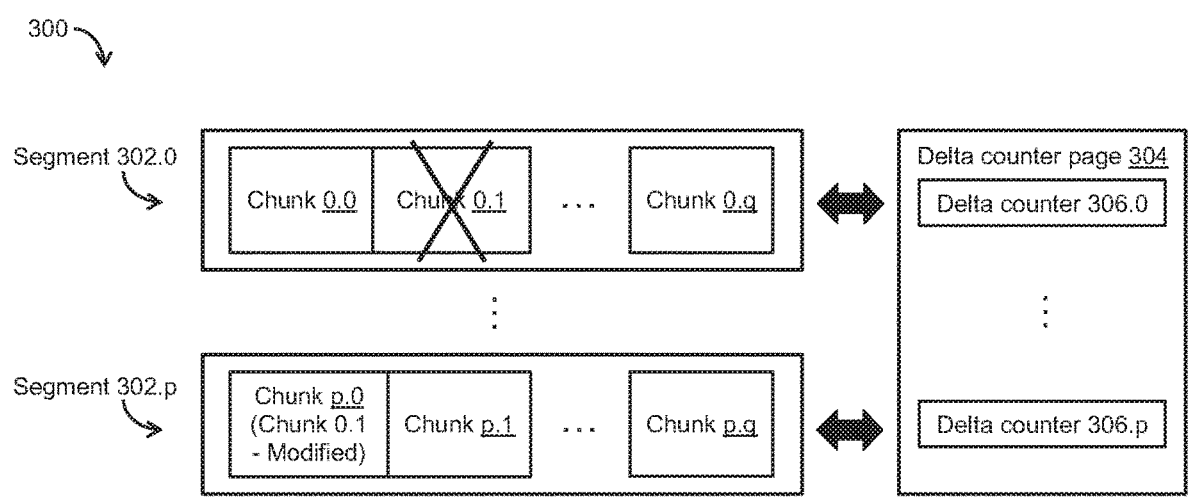
FIG. 3 is a block diagram of an exemplary plurality of data segments that can be written to log structured, filesystem-based data storage within the storage appliance of FIG. 2a, as well as an exemplary delta counter page that includes a plurality of delta counters associated with the plurality of data segments, respectively.

An illustrative example of the use of a plurality of delta counters in a persistent storage of a storage node is described below with reference to FIGS. 2a, 2b, and 3. In this example, an exemplary plurality of data segments 302.0, ..., 302.p (see FIG. 3) can be written to log structured, filesystem-based data storage within a storage appliance (e.g., the storage appliance 200; see FIG. 2a). Further, an exemplary plurality of delta counters 306.0, ..., 306.p implemented on a delta counter page 304 (see FIG. 3) of a storage node (e.g., the storage node 202; see FIG. 2b) can be associated with the plurality of data segments 302.0, ..., 302.p, respectively. For example, the delta counter page 304 can be accommodated within a persistent storage such as the persistent storage 216 of the storage node 202 (see FIG. 2b). As shown in FIG. 3, a plurality of data chunks 0.0, 0.1, ..., 0.q can be sequentially written as log structured data onto the segment 302.0. Likewise, a plurality of data chunks p.0, p.1, ..., p.q can be sequentially written as log structured data onto the segment 302.p. For example, the data chunks 0.0, 0.1, ..., 0.q can be sequentially written to the head of a log corresponding to the segment 302.0. Once the segment 302.0 becomes full, the head of the log can advance to an adjacent (or non-adjacent) segment with free storage space such as the segment 302.p, and subsequent data chunks (e.g., the data chunks p.0, p.1, ..., p.q) can be sequentially written to the head of a log corresponding to the segment 302.p.

As further shown in FIG. 3 for purposes of illustration, the data chunk 0.1 can originally be written onto the segment 302.0, and a modification of the data chunk 0.1 (chunk 0.1-modified) can be subsequently written onto the segment 302.p. For example, such a modification of the data chunk 0.1 can occur when a corresponding location of the data chunk 0.1 in a virtual volume (VVOL) is overwritten or unmapped. Because the modification of the data chunk 0.1 (chunk 0.1-modified) is written onto the segment 302.p, the data chunk 0.1 that was originally written onto the segment 302.0 is no longer valid and can be regarded as a deleted data chunk. The status of the original data chunk 0.1 as a deleted data chunk is indicated in FIG. 3 by a cross ("X") drawn through the data chunk 0.1 in the segment 302.0.

As described herein, each operation of a respective client 102.1, ..., 102.n that requires an update to filesystem statistics can be associated with a corresponding delta counter page in the persistent storage 216. With regard to FIG. 3, the write IO operations applied to the plurality of segments 302.0, ..., 302.p that require updates to filesystem statistics can be associated with the delta counter page 304. For example, when the data chunk 0.1 of the segment 302.0 is modified (i.e., the corresponding location in a VVOL is overwritten or unmapped), the utilization of the segment 302.0 is decreased while the utilization of the segment 302.p is increased. Further, the delta by which the utilization of the segment 302.0 is decreased can be stored by performing a transactional update of the delta counter 306.0. Likewise, the delta by which the utilization of the segment 302.p is increased can be stored by performing a transactional update of the delta counter 306.p. It is noted that the delta counters 306.0, ..., 306.p of the delta counter page 304 can each be atomically updated in a transactional fashion.

By providing each respective client with its own delta counter page(s) for client operations, the serialization of updates to filesystem statistics can be avoided. Moreover, by providing each respective storage node with its own independent set of delta counter pages, each implementing a plurality of delta counters, memory page swapping between a plurality of storage nodes can also be avoided. In addition, because the delta counter page 304 can be accommodated within a persistent storage of the storage node and updates to the delta counter page 304 can be performed in a transactional fashion, the recovery of delta counter information following a panic shutdown of the storage node can be achieved with reduced time and/or processing complexity.

Figure 4:
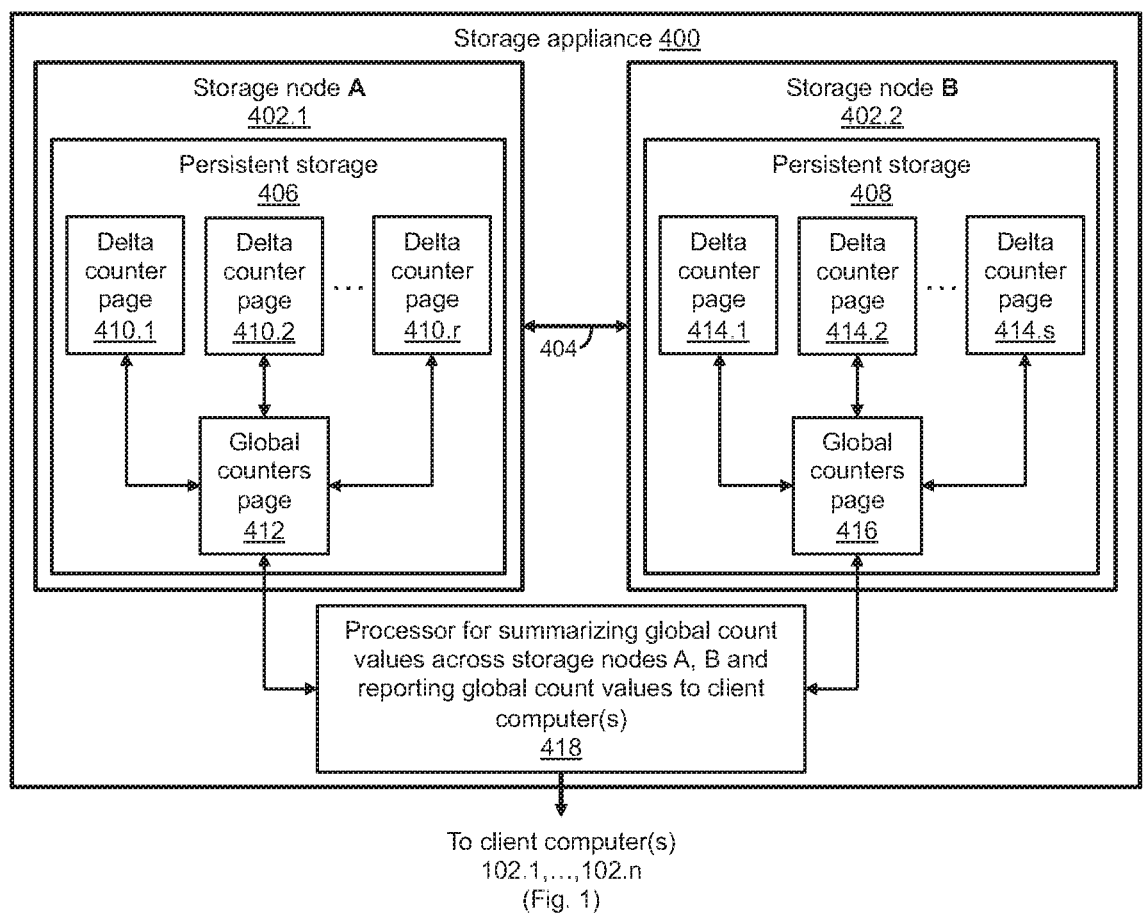
FIG. 4 is a block diagram of an exemplary storage appliance including two (2) storage nodes and a processor for summarizing global counts across the respective storage nodes and reporting the global counts to one or more client computers, in which each storage node includes, in a persistent storage, a set of delta counter pages and a global counters page.

The disclosed techniques for updating persistent statistics on a multi-transactional and multi-node storage system will be further understood with reference to the following illustrative example and FIGS. 1 and 4. In this example, a storage appliance 400 (see FIG. 4) is deployed in a distributed storage system environment such as the storage system environment 100 (see FIG. 1). Further, the storage appliance 400 is configured as an active-active storage system including two storage nodes, namely, a storage node A 402.1 and a storage node B 402.2, which can have simultaneous read-write IO access to the same storage objects or resources (e.g., volumes (VOLs), virtual volumes (VVOLs), logical units (LUs), file systems) within the storage system environment 100. As shown in FIG. 4, the storage node A 402.1 and the storage node B 402.2 are communicably connected to one another by at least one communication path 404.

As shown in FIG. 4, the storage node A 402.1 includes a persistent storage 406, and the storage node B 402.2 includes a persistent storage 408. The persistent storage 406 of the storage node A 402.1 is configured to accommodate a set of delta counter pages 410.1, 410.2, . . . , 410.r, and a global counters page 412 for summarizing delta count values tracked by the respective delta counters 410.1, . . . , 410.r. Likewise, the persistent storage 408 of the storage node B 402.2 is configured to accommodate a set of delta counter pages 414.1, 414.2, . . . , 414.s, and a global counters page 416 for summarizing delta count values tracked by the respective delta counters 414.1, . . . , 414.s. As further shown in FIG. 4, the storage appliance 400 includes a processor 418 configured to summarize global count values maintained on global counters pages 412, 416 of the storage nodes A 402.1, B 402.2, respectively. For example, such global count values can be summarized in a count summarization report, which can be sent from the storage appliance 400 to one or more of the respective clients 102.1, . . . , 102.n over the network(s) 110 (see FIG. 1).

In this example, in response to a first client operation, such as a first write IO operation performed by a respective one of the plurality of clients 102.1, . . . , 102.n (see FIG. 1), the storage node A 402.1 (see FIG. 4) receives a first write IO request to write a data chunk to log structured filesystem-based data storage. Upon receipt of the first write IO request, the storage node A 402.1 writes the data chunk onto a first data segment of the log structured filesystem-based data storage. In response to a second client operation, such as a second write IO operation performed by the respective client, the storage node A 402.1 receives a second write IO request to write a modified version of the data chunk to log structured filesystem-based data storage. Upon receipt of the second write IO request, the storage node A 402.1 writes the modified version of the data chunk onto a second data segment of the log structured filesystem-based data storage. In this example, the client operations pertaining to the first and second write IO requests can be associated with the delta counter page 410.1 or any other suitable delta counter page in the persistent storage 406. Further, the writing of the modified version of the data chunk onto the second data segment can cause the utilization of the first data segment to decrease and the utilization of the second data segment to increase.

In this example, having written the modified version of the data chunk onto the second data segment, the storage node A 402.1 updates a first delta counter of the delta counter page 410.1 to reflect the decreased utilization of the first data segment, and updates a second delta counter of the delta counter page 410.1 to reflect the increased utilization of the second data segment. In response to one or more additional client operations performed by the respective client, the storage node A 402.1 can write data chunks and/or modified versions of the data chunks to the log structured filesystem-based data storage, causing appropriate delta counters of one or more of the delta counter pages 410.1, . . . , 410.r to be updated. In addition, the storage node A 402.1 merges, on-demand, periodically, or at least at intervals, delta count values from delta counters implemented on some or all of the delta counter pages 410.1, . . . , 410.r into one or more global counters implemented on the global counters page 412.

In one embodiment, such merging of the delta count values into the global counters on the global counters page 412 can include adding the delta count values from different delta counter pages 410.1, . . . , 410.r to corresponding global count values on the global counters page 412, copying the delta count values from the different delta counter pages 410.1, . . . , 410.r to the global counters page 412, and/or any other suitable technique for summarizing the respective delta count values to the global counters page 412. Such merging of the delta count values into the global counters can be performed, on-demand, periodically, or at least at intervals, in a background summarization process. Such a background summarization process can include traversing through the plurality of delta counter pages 410.2, . . . , 410.r, and atomically updating filesystem statistics associated with the respective delta counter pages 410.2, . . . , 410.r on the global counters page 412. In one embodiment, such updating of filesystem statistics can include patching delta count values from each respective delta counter page 410.1, . . . , 410.r to the global counters page 412, and, having patched the delta count values to the global counters page 412, clearing the delta count values on the respective delta counter page 410.1, . . . , or 410.r. It is noted that, if, during the background summarization process, a delta counter page is in the process of being updated, then summarization of the delta count values maintained on the delta counter page can be deferred to a later time.

In this example, the storage node B 402.2 can satisfy client operations in a manner similar to that described above with reference to the storage node A 402.1, updating appropriate delta counters of the respective delta counter pages 414.1, . . . , 414.s and merging delta count values from the delta counters into global counters implemented on the global counters page 416. Moreover, in response to a request for a count summarization report from one of the respective clients 102.1, . . . , 102.n, the processor 418 of the storage appliance 400 can read global count values from global counters implemented on the global counter pages 412, 416 of the storage nodes A 402.1, B 402.2, respectively, summarize the global count values across the storage nodes A 402.1, B 402.2 in the count summarization report, and send the count summarization report to the respective client over the network(s) 110.

Figure 5:
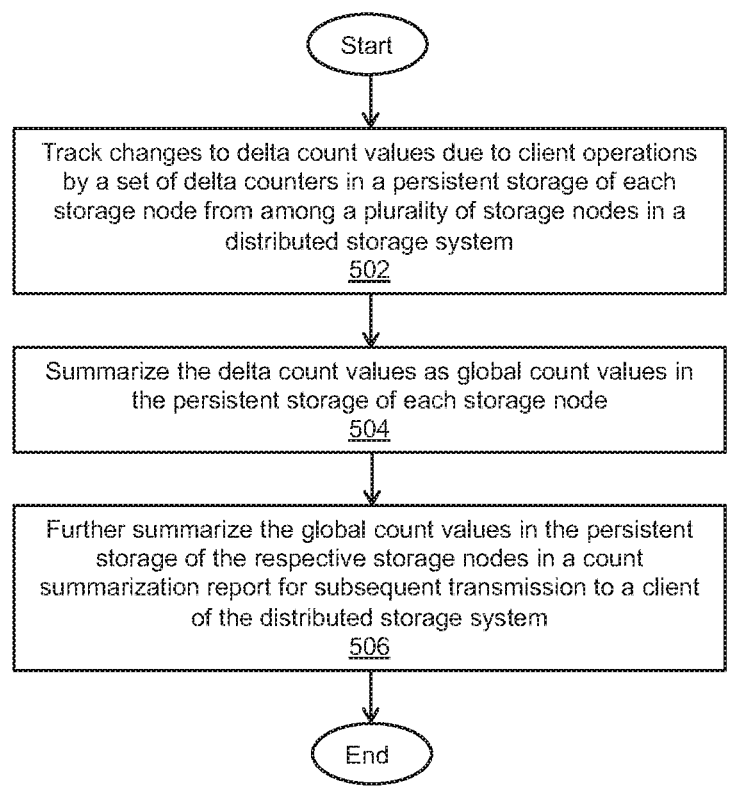
FIG. 5 is a flow diagram of an exemplary method of updating persistent statistics on a multi-transactional and multi-node storage system.

An exemplary method of updating persistent statistics on a multi-transactional and multi-node storage system is described below with reference to FIG. 5. As depicted in block 502, changes to delta count values due to client operations are tracked by a set of delta counters in a persistent storage of each storage node from among a plurality of storage nodes in a distributed storage system. As depicted in block 504, the delta count values are summarized as global count values in the persistent storage of each storage node. As depicted in block 506, the global count values in the persistent storage of the respective storage nodes are further summarized in a count summarization report for subsequent transmission to a client of the distributed storage system.

Figure 6:
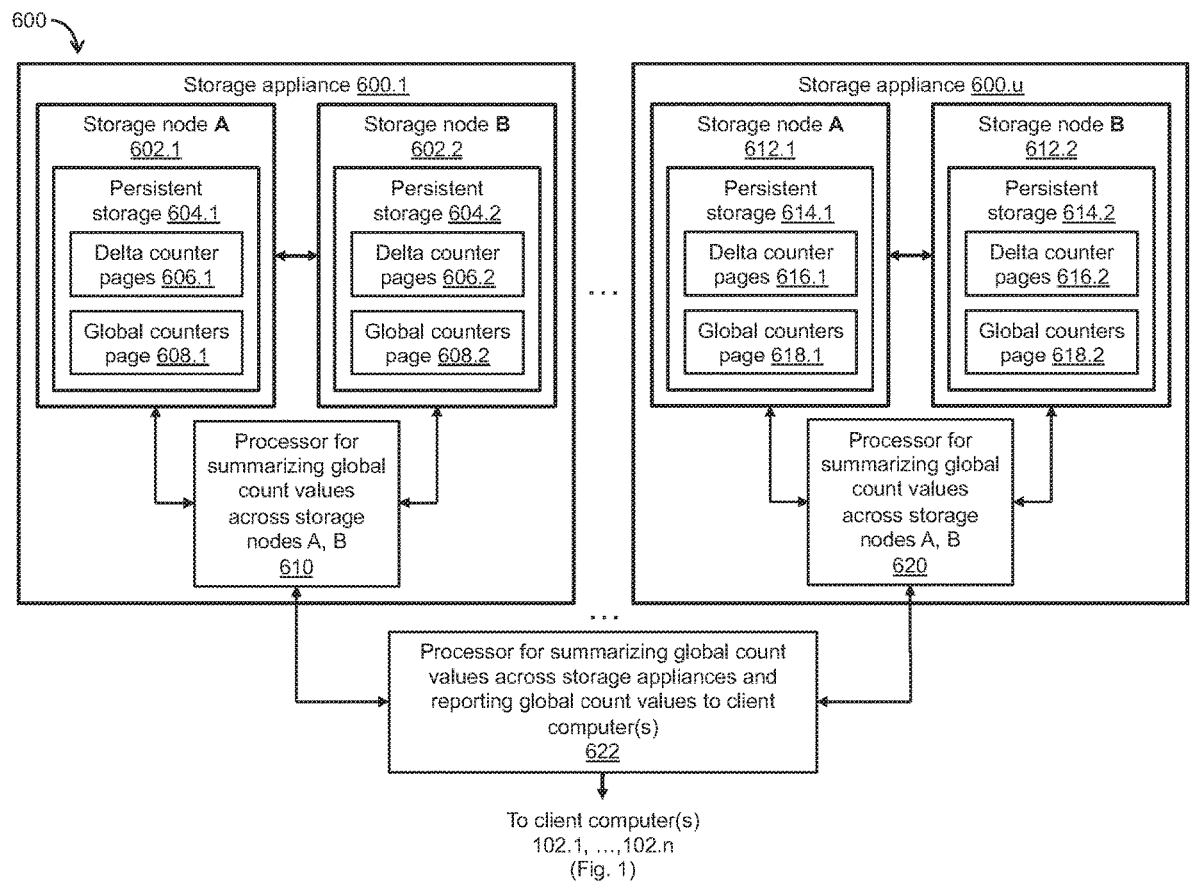
FIG. 6 is a block diagram of an exemplary storage appliance system that includes a plurality of storage appliances, and a processor for summarizing global counts across the respective storage appliances and reporting the global counts to one or more client computers.

Having described the above illustrative embodiments, one or more alternative embodiments and/or variations can be made and/or practiced. For example, FIG. 6 depicts an exemplary storage appliance system 600 that includes a plurality of storage appliances 600.1, . . . , 600.u, as well as a processor 620 for summarizing global count values across the respective storage appliances 600.1, . . . , 600.0 and reporting the summarized global count values to one or more of the clients 102.1, . . . , 102.n (see FIG. 1). For example, the plurality of storage appliances 600.1, . . . , 602.0 can be deployed in a distributed storage system environment such as the storage system environment 100 (see FIG. 1). As shown in FIG. 6, the storage appliance 600.1 can be configured as an active-active storage system including two storage nodes, namely, a storage node A 602.1 and a storage node B 602.2, which can have simultaneous read-write IO access to the same storage objects or resources (e.g., volumes (VOLs), virtual volumes (VVOLs), logical units (LUs), file systems) within the storage system environment 100. As shown in FIG. 6, the storage node A 602.1 and the storage node B 602.2 can be communicably connected to one another by at least one communication path (not numbered).

As further shown in FIG. 6, the storage node A 602.1 can include a persistent storage 604.1, and the storage node B 602.2 can include a persistent storage 604.2. The persistent storage 604.1 of the storage node A 602.1 can be configured to accommodate a set of delta counter pages 606.1, and a global counters page 608.1 for summarizing delta count values tracked by the respective delta counters. Likewise, the persistent storage 604.2 of the storage node B 602.2 can be configured to accommodate a set of delta counter pages 606.2, and a global counters page 608.2 for summarizing delta count values tracked by the respective delta counters. The storage appliance 600.1 can further include, in a first layer of global count summarization, a processor 610 configured to summarize, on-demand, periodically, or at least at intervals, global count values maintained on global counters pages 608.1, 608.2 of the storage nodes A 602.1, B 602.2, respectively.

Like the storage appliance 600.1, the storage appliance 600.0 can be configured as an active-active storage system including two storage nodes, namely, a storage node A 612.1 and a storage node B 612.2, which can have simultaneous read-write IO access to the same storage objects or resources (e.g., volumes (VOLs), virtual volumes (VVOLs), logical units (LUs), file systems) within the storage system environment 100. As shown in FIG. 6, the storage node A 612.1 and the storage node B 612.2 can be communicably connected to one another by at least one communication path (not numbered). The storage node A 612.1 can include a persistent storage 614.1, and the storage node B 612.2 can include a persistent storage 614.2. The persistent storage 614.1 of the storage node A 612.1 can be configured to accommodate a set of delta counter pages 616.1, and a global counters page 618.1 for summarizing delta count values tracked by the respective delta counters. Likewise, the persistent storage 614.2 of the storage node B 612.2 can be configured to accommodate a set of delta counter pages 616.2, and a global counters page 618.2 for summarizing delta count values tracked by the respective delta counters. The storage appliance 600.0 can further include, in the first layer of global count summarization, a processor 620 configured to summarize global count values maintained on global counters pages 618.1, 618.2 of the storage nodes A 612.1, B 612.2, respectively.

As further shown in FIG. 6, the storage appliance system 600 can include, in a second layer of global count summarization, an additional processor 622 configured to further summarize, on-demand, periodically, or at least at intervals, global count values across the respective storage appliances 600.1, . . . , 600.u. For example, the global count values summarized in the second layers of count summarization can be provided in a count summarization report, which can be sent to one or more of the plurality of clients 102.1, . . . , 102.n over the network(s) 110 (see FIG. 1). In this way, the global count values maintained by multiple storage appliances deployed in an expanded distributed storage system can be summarized and reported to the respective clients 102.1, . . . , 102.n. It is noted that the accuracy of global count values reported to the respective clients 102.1, . . . , 102.n can depend upon the summarization frequency at each layer of global count summarization, as well as the number of clients actively performing client operations. As the frequency of global count summarization is increased, the accuracy of global count values reported to the respective clients 102.1, . . . , 102.n can be increased.

In addition, it was described herein that a storage node can include a persistent storage configured to accommodate a set of delta counter pages and a global counters page for maintaining a summarization of delta count values tracked by the respective delta counters. In one embodiment, each time a summarization of the delta count values to the global counters page is performed, the storage node can maintain a local in-memory copy or representation of the global counters page maintained in the persistent storage. Further, each time the global counters page is updated, its local in-memory copy or representation can also be updated. By maintaining a local in-memory copy or representation of the global counters page, the storage node's access to information maintained on the global counters page can be accelerated. Moreover, in an embodiment of a distributed storage system that includes a plurality of storage nodes, each storage node can maintain a local in-memory copy or representation of the persistent global counters page from each respective storage node in the system. Further, once a summarization of delta count values to the global counters page is performed on a respective storage node, its local in-memory copies or representations of the global counters pages from all of the remaining storage nodes in the system can be refreshed. It is noted that the accuracy of global count values maintained in the local memory and persistent storage of the respective storage nodes is dependent upon the frequency of summarization of the delta count values.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of updating persistent statistics on a multi-transactional and multi-node storage system, comprising:
   tracking changes to delta count values due to client operations by a set of delta counters in a persistent storage of each respective storage node from among a first plurality of storage nodes in a distributed storage system;
   summarizing the delta count values tracked by the set of delta counters as global count values in the persistent storage of each respective storage node; and
   summarizing the global count values across the first plurality of storage nodes in a count summarization report for subsequent transmission to a client of the distributed storage system.

2. The method of claim 1 further comprising:
   in response to a first client operation, receiving, at the respective storage node, a first write input/output (TO) request; and
   upon receipt of the first write IO request, writing a data chunk onto a first data segment of log structured data storage.

3. The method of claim 2 further comprising:
   in response to a second client operation, receiving, at the respective storage node, a second write IO request; and
   upon receipt of the second write IO request, writing a modified version of the data chunk onto a second data segment of log structured data storage, each of the first client operation and the second client operation being associated with a first delta counter page from among a plurality of delta counter pages in the persistent storage, the set of delta counters being implemented on the first delta counter page.

4. The method of claim 3 further comprising:
   having written the modified version of the data chunk onto the second data segment of log structured data storage, updating a first delta counter from among the set of delta counters to reflect a decreased utilization of the first data segment, and updating a second delta counter from among the set of delta counters to reflect an increased utilization of the second data segment.

5. The method of claim 4 further comprising:
   in response to one or more additional client operations, receiving, at the respective storage node, one or more additional write IO requests; and
   in response to the additional write IO requests, writing one or more additional data chunks or modified versions of the additional data chunks to one or more additional data segments of log structured data storage.

6. The method of claim 5 wherein at least one of the additional client operations is associated with a second delta counter page from among the plurality of delta counter pages in the persistent storage, and wherein the method further comprises:
   having written the one or more additional data chunks or modified versions of the additional data chunks to the one or more additional data segments of log structured data storage, updating one or more additional delta counters of an additional set of delta counters implemented on the second delta counter page to reflect one or more of a decreased utilization and an increased utilization of the respective additional data segments.

7. The method of claim 6 wherein the summarizing of the delta count values includes summarizing (i) the delta count values tracked by the set of delta counters implemented on the first delta counter page and (ii) additional delta count values tracked by the additional set of delta counters implemented on the second delta counter page to obtain the global count values in the persistent storage of the respective storage node.

8. The method of claim 1 wherein the summarizing of the global count values across the first plurality of storage nodes is performed in a first layer of global count summarization, and wherein the method further comprises:
   summarizing, in the first layer of global count summarization, additional global count values across a second plurality of storage nodes in the distributed storage system.

9. The method of claim 8 further comprising:
  summarizing, in a second layer of global count summarization, the global count values across the first plurality of storage nodes and the additional global count values across the second plurality of storage nodes in the count summarization report for subsequent transmission to the client of the distributed storage system.

10. A distributed storage system, comprising:
  a first plurality of storage nodes,
  wherein each respective storage node from among the first plurality of storage nodes includes a persistent storage, the persistent storage including at least a first delta counter page, a second delta counter page, and a global counters page, and
  wherein each respective storage node from among the first plurality of storage nodes includes a first processor configured to execute program instructions out of a memory to:
    track, by a set of delta counters implemented on the first delta counter page, changes to delta count values due to one or more client operations;
    summarize, by one or more global counters implemented on the global counters page, the delta count values as global count values in the persistent storage of each respective storage node; and
    summarize the global count values across the first plurality of storage nodes in a count summarization report for subsequent transmission to a client of the distributed storage system.

11. The distributed storage system of claim 10 wherein the first processor is further configured to execute program instructions out of the memory:
  in response to a first client operation, to receive, at the respective storage node, a first write input/output (TO) request; and
  upon receipt of the first write IO request, to write a data chunk onto a first data segment of log structured data storage.

12. The distributed storage system of claim 11 wherein the first processor is further configured to execute program instructions out of the memory:
  in response to a second client operation, to receive, at the respective storage node, a second write IO request; and
  upon receipt of the second write IO request, to write a modified version of the data chunk onto a second data segment of log structured data storage, each of the first client operation and the second client operation being associated with the first delta counter page.

13. The distributed storage system of claim 12 wherein the first processor is further configured to execute program instructions out of the memory:
  having written the modified version of the data chunk onto the second data segment of log structured data storage, to update a first delta counter from among the set of delta counters to reflect a decreased utilization of the first data segment, and to update a second delta counter from among the set of delta counters to reflect an increased utilization of the second data segment.

14. The distributed storage system of claim 13 wherein the first processor is further configured to execute program instructions out of the memory:
  in response to one or more additional client operations, to receive, at the respective storage node, one or more additional write IO requests; and
  in response to the additional write IO requests, to write one or more additional data chunks or modified versions of the additional data chunks to one or more additional data segments of log structured data storage.

15. The distributed storage system of claim 14 wherein at least one of the additional client operations is associated with the second delta counter page, and wherein the first processor is further configured to execute program instructions out of the memory:
  having written the one or more additional data chunks or modified versions of the additional data chunks to the one or more additional data segments of log structured data storage, to update one or more additional delta counters of an additional set of delta counters implemented on the second delta counter page to reflect one or more of a decreased utilization and an increased utilization of the respective additional data segments.

16. The distributed storage system of claim 15 wherein the first processor is further configured to execute program instructions out of the memory to summarize (i) the delta count values tracked by the set of delta counters implemented on the first delta counter page and (ii) additional delta count values tracked by the additional set of delta counters implemented on the second delta counter page to obtain the global count values in the persistent storage of the storage node.

17. The distributed storage system of claim 10 wherein the distributed storage system includes a second plurality of storage nodes, wherein each respective storage node from among the second plurality of storage nodes includes a second processor, wherein the first processor is further configured to execute program instructions out of the memory to:
  summarize, in a first layer of global count summarization, the global count values across the first plurality of storage nodes in the distributed storage system, and
  wherein the second processor is configured to execute program instructions out of a memory to summarize, in the first layer of global count summarization, additional global count values across the second plurality of storage nodes in the distributed storage system.

18. The distributed storage system of claim 17 further comprising:
  a third processor configured to execute program instructions out of a memory to summarize, in a second layer of global count summarization, the global count values across the first plurality of storage nodes and the additional global count values across the second plurality of storage nodes in the count summarization report for subsequent transmission to the client of the distributed storage system.

19. A computer program product including a set of non-transitory, computer-readable media having instructions that, when executed by storage processing circuitry, cause the storage processing circuitry to perform a method comprising:
  tracking changes to delta count values due to client operations by a set of delta counters in a persistent storage of each respective storage node from among a first plurality of storage nodes in a distributed storage system;
  summarizing the delta count values tracked by the set of delta counters as global count values in the persistent storage of each respective storage node; and
  summarizing the global count values across the first plurality of storage nodes in a count summarization report for subsequent transmission to a client of the distributed storage system.

20. The computer program product of claim 19 wherein the summarizing of the global count values across the first plurality of storage nodes is performed in a first layer of global count summarization, and wherein the method further comprises:
   summarizing, in the first layer of global count summarization, additional global count values across a second plurality of storage nodes in the distributed storage system; and
   summarizing, in a second layer of global count summarization, the global count values across the first plurality of storage nodes and the additional global count values across the second plurality of storage nodes in the count summarization report for subsequent transmission to the client of the distributed storage system.

* * * * *